United States Patent [19]
Ishikawa

[11] Patent Number: 6,157,158
[45] Date of Patent: Dec. 5, 2000

[54] MOLD CLAMPING CONTROL APPARATUS

[75] Inventor: Atsushi Ishikawa, Chiba, Japan

[73] Assignee: Sumitomo Heavy Industries, Ltd., Tokyo, Japan

[21] Appl. No.: 09/423,631

[22] PCT Filed: Aug. 29, 1999

[86] PCT No.: PCT/JP99/01584

§ 371 Date: Nov. 16, 1999

§ 102(e) Date: Nov. 16, 1999

[87] PCT Pub. No.: WO99/50045

PCT Pub. Date: Oct. 7, 1999

[30] Foreign Application Priority Data

Mar. 31, 1998 [JP] Japan .................................. 10/086110

[51] Int. Cl.[7] .................................................. G05G 5/00
[52] U.S. Cl. ........................ 318/626; 318/560; 264/40.5; 264/40.7
[58] Field of Search .................................. 318/600, 626, 318/560; 264/40.5, 40.7

[56] References Cited

U.S. PATENT DOCUMENTS

| 5,045,253 | 9/1991 | Kamiguchi et al. | 264/40.5 |
| 5,059,365 | 10/1991 | Hertzer et al. | 264/40.5 |
| 5,149,471 | 9/1992 | Catanzaro et al. | 264/40.5 |
| 5,217,662 | 6/1993 | Yamamura et al. | 264/40.5 |
| 5,547,619 | 8/1996 | Obayashi | 264/40.1 |
| 5,587,633 | 12/1996 | Aoki et al. | 318/164 |
| 5,929,583 | 7/1998 | Catanzaro et al. | 318/565 |

FOREIGN PATENT DOCUMENTS 4-201429 7/1992 Japan .
5-237894 9/1993 Japan .

Primary Examiner—Robert E. Nappi
Assistant Examiner—Rita Leykin
Attorney, Agent, or Firm—Arent Fox Kitner Plotkin & Kahn, PLLC

[57] ABSTRACT

A mold clamping control apparatus (49) capable of accurately generating mold clamping force is provided. The mold clamping control apparatus (49) comprises: a stationary platen (11) to which a stationary mold (15) is attached; a movable platen (34) to which a movable mold (16) is attached, the movable platen (34) being disposed to reciprocate while facing the stationary platen (11); a driver; a movement member which is moved through drive of the driver; a transmission mechanism connecting the movement member and the movable platen (34); detector for detecting the position of the movement member; memory for storing, in a relational manner, positions of the movement member during movement in accordance with a predetermined position pattern, and a mold clamping force generated at each of the positions; a mold clamping force setting device (50) for setting a mold clamping force; a mold clamping force pattern generator (51) for generating a mold clamping force pattern on the basis of the set mold clamping force; and position controller reading from the memory positions of the movement member corresponding to the mold clamping force pattern and for driving the driver on the basis of the read positions. In a mold clamping force adjustment mode, positions of the movement member during movement in accordance with a predetermined position pattern and a mold clamping force generated at each of the positions are stored in the memory in a relational manner. In a mold clamping force generation mode, positions of the movement member corresponding to the mold clamping force pattern are read from the memory.

4 Claims, 4 Drawing Sheets

MOLD CLAMPING CONTROL APPARATUS

TECHNICAL FIELD

The present invention relates to a mold clamping control apparatus.

BACKGROUND ART

In a conventional motor-driven mold clamping apparatus, mold clamping force is generated by use of a mechanism such that an output shaft of an electric motor such as a servomotor is connected to a toggle mechanism via a ball screw. Rotation generated through drive of the servomotor is transmitted via the output shaft to the ball screw and is then converted to thrust force by the balls crew. The thrust force is then amplified by the toggle mechanism to thereby obtain a mold clamping force. Further, a crosshead is disposed between the ball screw and the toggle mechanism, and the above-described thrust force is transmitted to the toggle mechanism via the crosshead.

In the conventional motor-driven mold clamping apparatus, in order to generate a preset mold clamping force, the crosshead must be moved to a precise position corresponding to the mold clamping force.

However, since the relationship between the position of the crosshead and mold clamping force becomes nonlinear as a result of the structural limitation of the toggle mechanism, calculation for obtaining the position of the crosshead is difficult. Therefore, a desired mold clamping force cannot be generated with precision. In addition, since each individual mold clamping apparatus involves mechanical error of a different degree, even if calculation for obtaining the position of the crosshead is possible, the calculation must be performed for each of the mold clamping apparatuses, resulting in an increase in cost thereof.

Moreover, when play is produced in movable parts such as the ball screw and pins and bushes of the toggle mechanism, or when the friction characteristics of the movable parts change, the mold clamping force changes accordingly, resulting in molded products of deteriorated quality.

An object of the present invention is to solve the above-mentioned problems in the conventional mold clamping apparatus, and to provide a mold clamping control apparatus capable of accurately generating mold clamping force, reducing the cost of the mold clamping apparatus, and improving the quality of molded products.

DISCLOSURE OF THE INVENTION

To achieve the above object, a mold clamping control apparatus according to the present invention comprises: a stationary platen to which a stationary mold is attached; a movable platen to which a movable mold is attached, the movable platen being disposed such that the movable platen can reciprocate while facing the stationary platen; a motor; motion conversion means for converting rotational motion generated through drive of the motor to linear motion and for transmitting the linear motion to a movement member; a transmission mechanism connecting the movement member and the movable platen; detection means for detecting the position of the movement member; memory means for storing, in a relational manner, positions of the movement member during movement in accordance with a predetermined position pattern, and a mold clamping force generated at each of the positions; a mold clamping force setting device for setting a mold clamping force; a mold clamping force pattern generator for generating a mold clamping force pattern on the basis of the set mold clamping force; and position control means for reading from the memory means positions of the movement member corresponding to the mold clamping force pattern and for driving the motor.

In a mold clamping force adjustment mode, positions of the movement member during movement in accordance with a predetermined position pattern and a mold clamping force generated at each of the positions are stored in the memory means in a relational manner. In a mold clamping force generation mode, positions of the movement member corresponding to the mold clamping force pattern are read from the memory means, and the motor is driven on the basis of the read positions of the movement member. Therefore, the movement member can be moved to a precise position corresponding to a mold clamping force, resulting in accurate generation of the mold clamping force.

Further, when each of a plurality of mold clamping apparatuses has a different degree of machine error, for each mold clamping apparatus the relationship between position of the movement member and mold clamping force can be stored in the memory means, so that mold clamping force can be generated accurately. Therefore, the cost of the mold clamping apparatuses can be reduced.

Moreover, when play is produced in movable parts such as the motion conversion means and pins and bushes used in the transmission mechanism, or when the friction characteristics of the movable parts change, the relationship between position of the movement member and mold clamping force can be re-stored in the memory means, so that mold clamping force can be generated accurately. Therefore, quality of molded products is improved.

Another mold clamping apparatus according to the present invention further comprises a mold clamping force detector for detecting mold clamping force, and feedback control means for effecting feedback control on the basis of the above-described mold clamping force pattern and detected mold clamping force.

In this case, the feedback control enables the mold clamping force to be generated more accurately.

BEST MODE FOR CARRYING OUT THE INVENTION

An embodiment of the present invention will next be described in detail with reference to the drawings.

Figure 2:
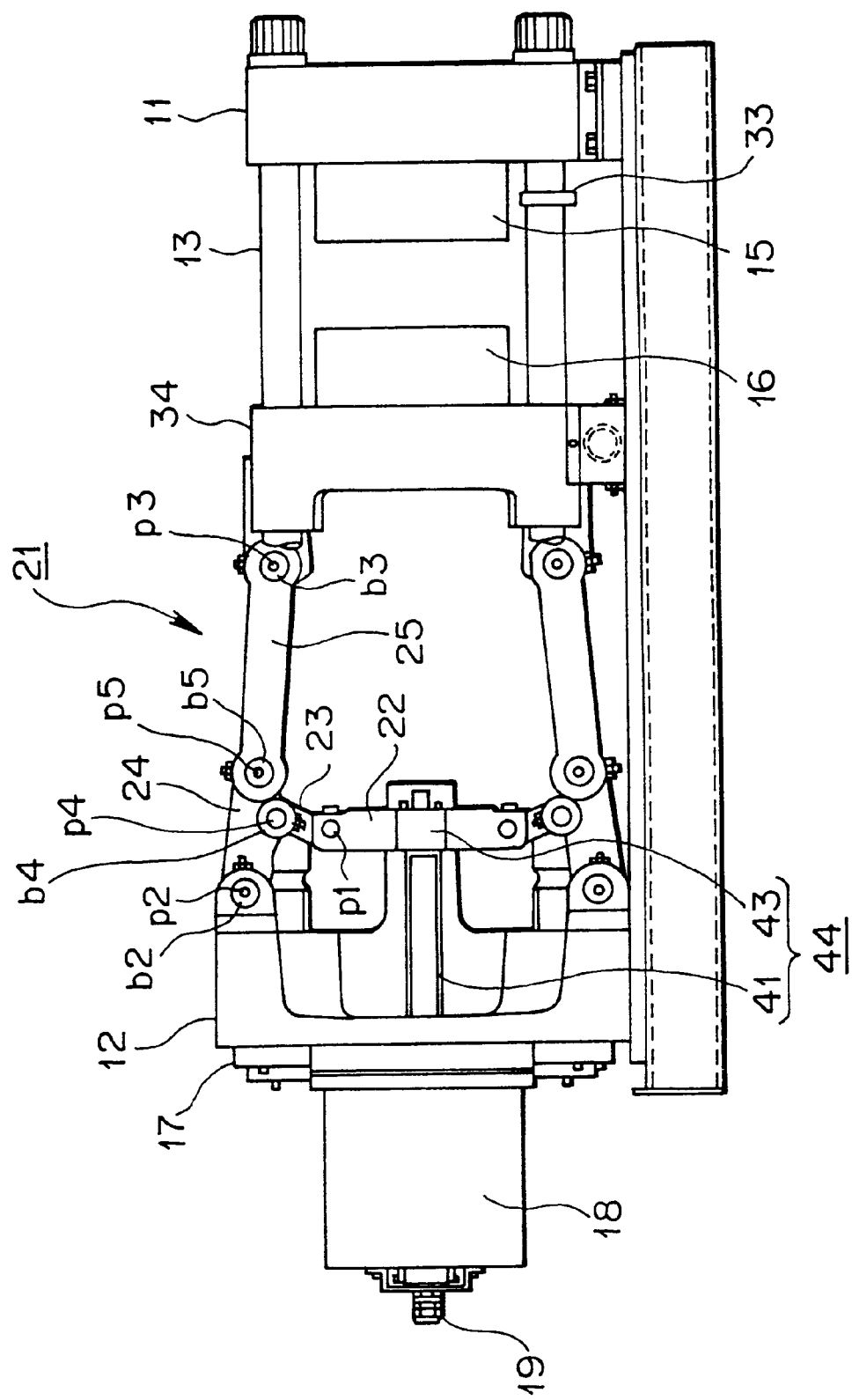
FIG. 2 is a schematic view of a mold clamping apparatus according to the embodiment of the present invention.

FIG. 2 is a schematic view of a mold clamping apparatus according to an embodiment of the present invention.

In FIG. 2, reference numeral 11 denotes a stationary pilaten; 12 denotes a toggle support serving as a base plate; 13 denotes tie bars disposed to extend between the stationary platen 11 and the toggle support 12; and 34 denotes a movable platen disposed to face the stationary platen 11 such that the movable platen can advance and retract (move in the right/left direction in FIG. 2) along the tie bars 13. A stationary mold 15 and a movable mold 16 are attached to the stationary platen 11 and the movable platen 34, respectively, such that the stationary mold 15 and the movable mold 16 face each other.

A toggle mechanism 21 serving as a transmission mechanism is disposed between the toggle support 12 and the movable platen 34. Through reciprocation between the toggle support 12 and the movable platen 34 of a crosshead 22 serving as a movement member, the movable platen 34 is advanced and retracted along the tie bars 13 in order to bring the movable mold 16 into contact with and separate the same from the stationary mold 15. Thus, mold closing, clamping, and opening operations are performed.

The toggle mechanism 21 comprises toggle levers 23 pivotally supported by the crosshead 22, toggle levers 24 pivotally supported by the toggle support 12; and toggle arms 25 pivotally supported by the movable platen 34. The toggle levers 23 and the toggle levers 24 are link-connected with each other, and the toggle levers 24 and the toggle arms 25 are link-connected with each other. Pins p1 are disposed between the crosshead 22 and the toggle levers 23; pins p2 are disposed between the toggle support 12 and the toggle levers 24; pins p3 are disposed between the movable platen 34 and the toggle arms 25; pins p4 are disposed between the toggle levers 23 and 24; and pins p5 are disposed between the toggle levers 24 and the toggle arms 25. Bushes b2–b5 are disposed to surround the pins p2–p5, respectively.

Further, a ball screw shaft 41 is rotatably supported by the toggle support 12 and is in screw-engagement with a ball nut 43 disposed on the crosshead 22. The ball screw shaft 41 and the ball nut 43 constitute a ball screw 44 serving as motion conversion means for converting rotational motion generated by a servomotor 18 (an electric motor serving as drive means) to linear motion and for transmitting the linear motion to the crosshead 22.

In order to rotate the ball screw shaft 41, the servomotor 18 is attached to a rear face of the toggle support 12, and an unillustrated output shaft of the servomotor 18 is connected to the ball screw shaft 41. Reference numeral 17 denotes a mold thickness adjuster, and reference numeral 19 denotes an encoder serving as detection means for detecting the position of the crosshead 22 through detection of the number of revolutions of the servomotor 18.

When the servomotor 18 is driven to rotate its output shaft, the rotational force is converted to thrust force by the ball screw 44, and the thrust force is transmitted to the crosshead 22. Therefore, when the servomotor 18 is driven to rotate in the forward and backward directions, the ball screw shaft 41 is rotated in the forward and backward directions, so that the crosshead 22 reciprocates.

When the crosshead 22 is advanced (moved rightward in FIG. 2), the toggle mechanism 21 extends, so that the movable platen 34 and the movable mold 16 are advanced to effect the mold closing and clamping operations. As a result, an unillustrated cavity is formed between the movable mold 16 and the stationary mold 15. When the crosshead 22 is retracted (moved leftward in FIG. 2), the toggle mechanism 21 contracts, so that the movable platen 34 and the movable mold 16 are retracted to effect the mold opening operation.

In the mold clamping operation, as the toggle mechanism 21 extends, mold clamping force is generated, resulting in extension of the tie bars 13. At this time, the amount of extension of the tie bars 13 is detected by the mold clamping force detector 33; and the rotational angle of the servomotor 18 is detected by the encoder 19 in order to indirectly detect the position of the crosshead 22. The mold clamping force detector 33 may be a distortion sensor which is attached to a member of the mold clamping apparatus other than the tie bars 13 in order to detect an amount of distortion of the member stemming from the mold clamping force.

The mold clamping force is set by use of an unillustrated mold clamping force setting device. In order for the mold clamping force thus set to be generated, the crosshead 22 must be accurately moved to a position corresponding to the mold clamping force.

However, since the relationship between the position of the crosshead 22 and mold clamping force becomes nonlinear as a result of the structural limitation of the toggle mechanism 21, calculating the position of the crosshead 22 is difficult. Therefore, a desired mold clamping force cannot be generated with precision. In addition, since each individual mold clamping apparatus involves mechanical error of a different degree, even if such calculation for obtaining the position of the crosshead 22 is possible, the calculation must be performed for each of the mold clamping apparatuses, resulting in an increase in cost thereof.

Moreover, when play is produced in movable parts such as the ball screw 44, the pins p1–p5, or the bushes b2–b5, or when the friction characteristics of the movable parts change, the mold clamping force changes accordingly, resulting in molded products of deteriorated quality.

In view of the foregoing, a mold clamping control apparatus is disposed in order to enable accurate generation of mold clamping force, reduce the cost of the mold clamping apparatus, and improve the quality of molded products.

Figure 1:
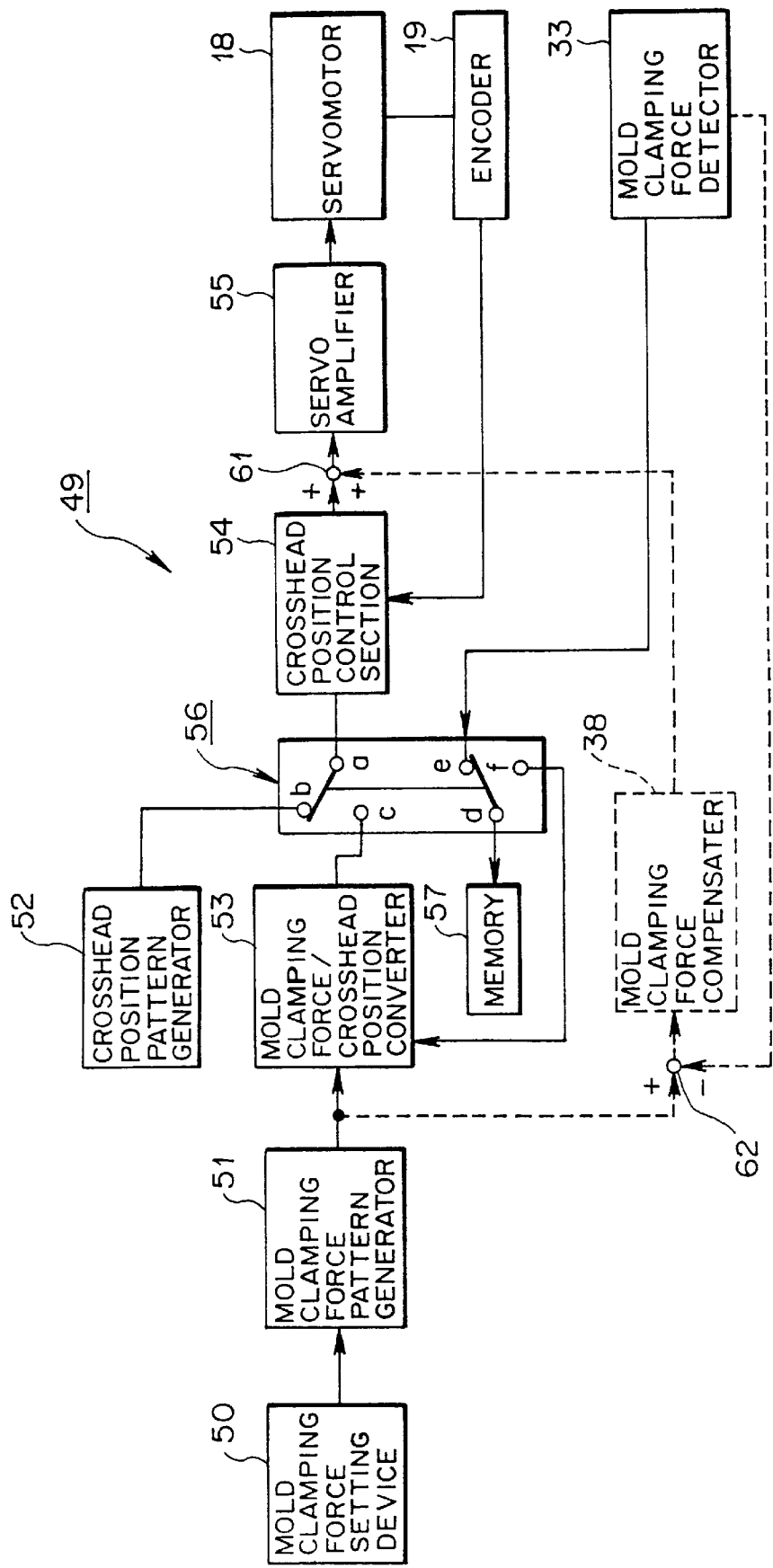
FIG. 1 is a schematic diagram of a mold clamping control apparatus according to an embodiment of the present invention.
Figure 3:
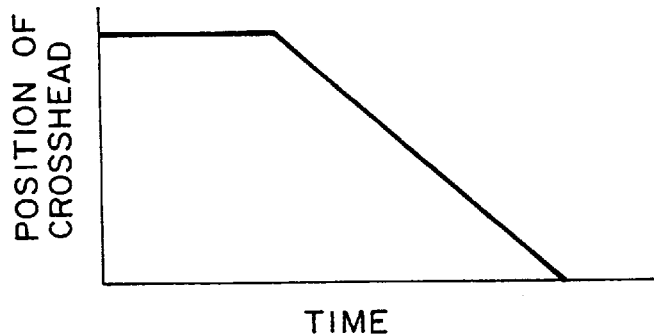
FIG. 3 is a first graph showing the characteristics of the crosshead in the embodiment of the present invention.
Figure 4:
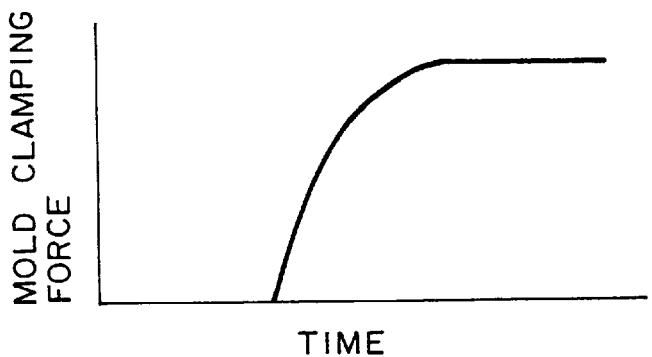
FIG. 4 is a second graph showing the characteristics of the crosshead in the embodiment of the present invention.
Figure 5:
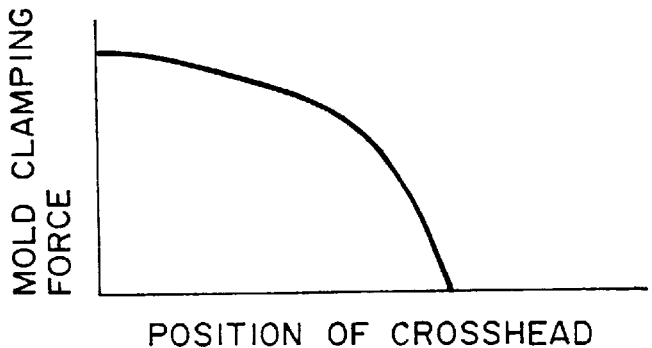
FIG. 5 is a third graph showing the characteristics of the crosshead in the embodiment of the present invention.
Figure 6:
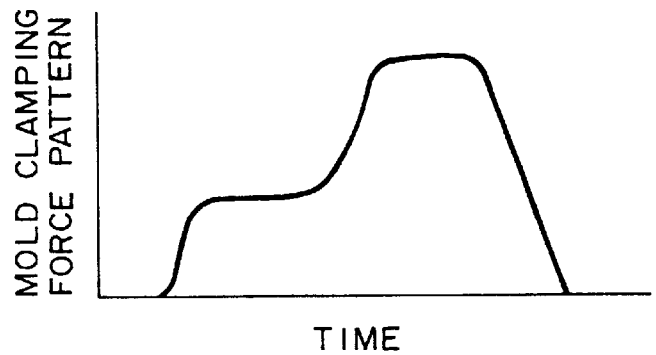
FIG. 6 is a first graph showing the characteristics of the mold clamping control apparatus according to the embodiment of the present invention.
Figure 7:
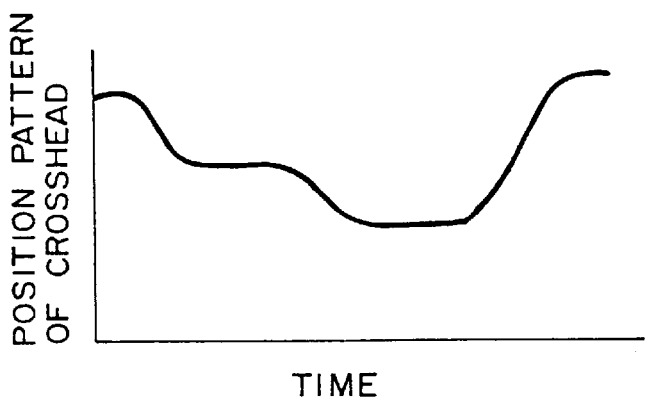
FIG. 7 is a second graph showing the characteristics of the mold clamping control apparatus according to the embodiment of the present invention.
Figure 8:
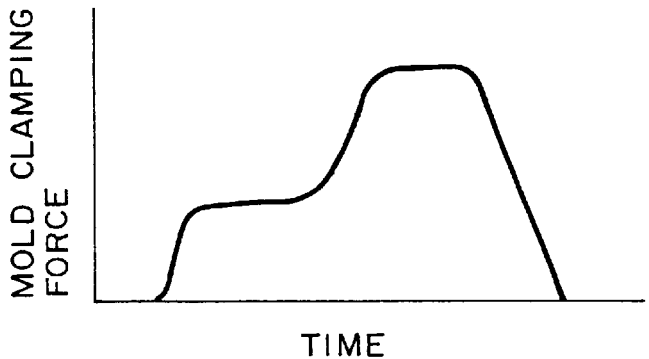
FIG. 8 is a third graph showing the characteristics of the mold clamping control apparatus according to the embodiment of the present invention.

FIG. 1 is a schematic diagram of a mold clamping control apparatus according to the embodiment of the present invention; FIG. 3 is a first graph showing the characteristics of the crosshead in the embodiment of the present invention; FIG. 4 is a second graph showing the characteristics of the crosshead in the embodiment of the present invention; FIG. 5 is a third graph showing the characteristics of the crosshead in the embodiment of the present invention; FIG. 6 is a first graph showing the characteristics of the mold clamping control apparatus according to the embodiment of the present invention; FIG. 7 is a second graph showing the characteristics of the mold clamping control apparatus according to the embodiment of the present invention; and FIG. 8 is a third graph showing the characteristics of the mold clamping control apparatus according to the embodiment of the present invention. In FIG. 3, the horizontal axis represents time, and the vertical axis represents the position of the crosshead. In FIGS. 4 and 8, the horizontal axis represents time, and the vertical axis represents mold clamping force. In FIG. 5, the horizontal axis represents the position of the crosshead, and the vertical axis represents mold clamping force. In FIG. 6, the horizontal axis represents time, and the vertical axis represents a mold clamping force pattern. In FIG. 7, the horizontal axis represents time, and the vertical axis represents a position pattern with respect to the crosshead.

In FIG. 1, reference numeral 49 denotes a mold clamping control apparatus, and 56 denotes a switch. The switch 56 has a mechanically or electronically switchable structure, and is switched automatically or manually by an operator between a mold clamping force adjustment mode and a mold clamping force generation mode.

In the mold clamping force adjustment mode, as shown in FIG. 1, connection is established between terminals a and b and between terminals d and e, and a crosshead position pattern generator 52 is operated to generate a preset position pattern with respect to the crosshead 22 (FIG. 2). As a result, a crosshead position control section 54 generates a speed command on the basis of a detection signal output from the encoder 19. The speed command is fed to a servo amplifier 55 via an adder 61. The servo amplifier 55 generates current corresponding to the speed command and supplies the generated current to the servomotor 18 in order to drive the servomotor 18. As a result, the crosshead 22 is moved in accordance with the position pattern.

As the crosshead 22 moves to a predetermined position, as shown in FIG. 3, a value indicating the position of the crosshead 22 decreases gradually, and mold clamping force is generated in accordance therewith, as shown in FIG. 4. During this operation, the mold clamping force is detected by the mold clamping force detector 33.

Accordingly, data representing the relationship between mold clamping force and position of the crosshead 22 as shown in FIG. 5 can be obtained on the basis of the position pattern generated by the crosshead position pattern generator 52, as well as the mold clamping force detected by the mold clamping force detector 33. An unillustrated CPU stores in a relational manner in a memory 57 serving as memory means positions of the crosshead 22 and corresponding mold clamping forces.

When the switch 56 is switched to the mold clamping force generation mode, connection is established between terminals a and c and between terminals d and f, and a mold clamping force preset by use of a mold clamping force setting device 50 is generated.

That is, on the basis of the mold clamping force that is set in advance by use of the mold clamping force setting device 50, a mold clamping force pattern generator 51 generates a mold clamping force pattern as shown in FIG. 6, and outputs the mold clamping force pattern to a mold clamping force/crosshead position converter 53. Upon receipt of the mold clamping force pattern, the mold clamping force/crosshead position converter 53 reads from the memory 57 positions of the crosshead 22 corresponding to the mold clamping force pattern and generates a position pattern as shown in FIG. 7. The position pattern is output to the crosshead position control section 54.

The crosshead position control section 54 generates a speed command on the basis of a detection signal from the encoder 19. The thus-generated speed command is output to a servo amplifier 55 via the adder 61. The servo amplifier 55 generates current corresponding to the speed command and supplies the generated current to the servomotor 18 in order to drive the servomotor 18. As a result, the crosshead 22 is moved in accordance with the position pattern. The mold clamping force/crosshead position converter 53, the crosshead position control section 54, and the servo amplifier 55 constitute position control means.

When the position of crosshead 22 is controlled in an actual operation on the basis of the position pattern, as shown in FIG. 8, the mold clamping force preset by use of a mold clamping force setting device 50 is generated accurately. If necessary, an operation for correction may be performed such that the switch 56 is switched, and the mold clamping force is detected by use of the mold clamping force detector 33 in order to correct the data which are stored in the memory 57 and represent the relationship between mold clamping force and the position of the crosshead 22.

As described above, in the mold clamping force adjustment mode, positions of the crosshead 22 during movement in accordance with a predetermined position pattern and a mold clamping force generated at each of the positions are stored in the memory 57 in a relational manner. In the mold clamping force generation mode, positions of the crosshead 22 corresponding to the mold clamping force patterns are read from the memory 57, and the servomotor 18 is driven on the basis of the read positions of the crosshead 22. Therefore, the crosshead 22 can be moved to a precise position corresponding to a mold clamping force, resulting in accurate generation of the mold clamping force.

Further, when each of a plurality of mold clamping apparatuses has a different degree of machine error, for each of the mold clamping apparatuses the relationship between position of the crosshead 22 and mold clamping force can be stored in the memory 57, so that mold clamping force can be generated accurately. Therefore, the cost of the mold clamping apparatuses can be reduced.

Moreover, when play is produced in movable parts such as the ball screw 44, the pins p1–p5, or the bushes b2–b5, or when the friction characteristics of the movable parts change, the relationship between the position of the crosshead 22 and mold clamping force can be re-stored in the memory 57, so that mold clamping force can be generated accurately. Therefore, quality of molded products is improved.

The above-described structure may be modified such that the mold clamping force pattern generated by the mold clamping force pattern generator 51 and the mold clamping force detected by the mold clamping force detector 33 are fed to a subtracter 62 serving as a feedback control means, in order to calculate a deviation between the mold clamping force patttern and the detected mold clamping force. In this case, the deviation is fed to the adder 61 via a mold clamping force compensater 38, so that the deviation is added to the speed command in the adder 61. This feedback control enables the mold clamping force to be generated more accurately.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention can be applied to mold clamping apparatus provided in injection molding machines.

What is claimed is:

1. A mold clamping control apparatus comprising:
(a) a stationary platen to which a stationary mold is attached;
(b) a movable platen to which a movable mold is attached, said movable platen being disposed such that said movable platen can reciprocate while facing said stationary platen;
(c) drive means;
(d) a movement member which is moved through drive of said drive means;
(e) a transmission mechanism connecting said movement member and said movable platen;

(f) detection means for detecting the position of said movement member;

(g) memory means for storing, in a relational manner, positions of said movement member during movement in accordance with a predetermined position pattern, and a mold clamping force generatad at each of the positions;

(h) a mold clamping force setting device for setting a mold clamping force;

(i) a mold clamping force pattern generator for generating a mold clamping force pattern on the basis of the set mold clamping force; and (j) position control means for reading from said memory means positions of said movement member corresponding to the mold clamping force pattern and for driving said drive means.

2. A mold clamping control apparatus comprising:

(a) a stationary platen to which a stationary mold is attached;

(b) a movable platen to which a movable mold is attached, said movable platen being disposed such that said movable platen can reciprocate while facing said stationary platen;

(c) a motor;

(d) motion conversion means for converting rotational motion generated through drive of said motor to linear motion and for transmitting the linear motion to a movement member;

(e) a transmission mechanism connecting said movement member and said movable platen;

(f) detection means for detecting the position of said movement member;

(g) memory means for storing, in a relational manner, positions of said movement member during movement in accordance with a predetermined position pattern, and a mold clamping force generated at each of the positions;

(h) a mold clamping force setting device for setting a mold clamping force;

(i) a mold clamping force pattern generator for generating a mold clamping force pattern on the basis of the set mold clamping force; and (j) position control means for reading from said memory means positions of said movement member corresponding to the mold clamping force pattern and for driving said motor.

3. A mold clamping control apparatus according to claim 1 or 2, further comprising a mold clamping force detector for detecting mold clamping force.

4. A mold clamping control apparatus according to claim 1 or 2, further comprising (a) a mold clamping force detector for detecting mold clamping force; and (b) feedback control means for effecting feedback control on the basis of the mold clamping force pattern and detected mold clamping force.

* * * * *

UNITED STATES PATENT AND TRADEMARK OFFICE
CERTIFICATE OF CORRECTION

PATENT NO. : 6,157,158
DATED : December 5, 2000
INVENTOR(S) : Atsushi Ishikawa

It is certified that error appears in the above-identified patent and that said Letters Patent is hereby corrected as shown below:

<u>Title page,</u>
Item [22], PCT Filed: delete "Aug. 29, 1999" and insert -- Mar. 29, 1999 --

Signed and Sealed this

Fifth Day of November, 2002

*Attest:*

*Attesting Officer*

JAMES E. ROGAN
*Director of the United States Patent and Trademark Office*